March 24, 1942.     H. NUTT     2,277,558
TORSIONAL VIBRATION DAMPENER
Filed July 29, 1940
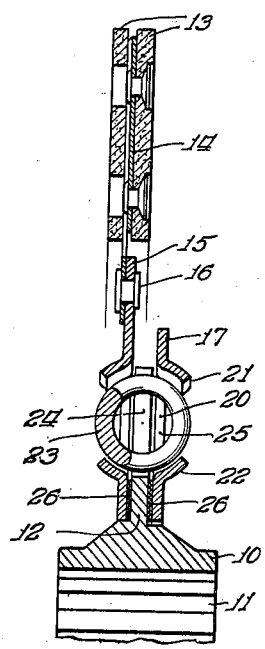
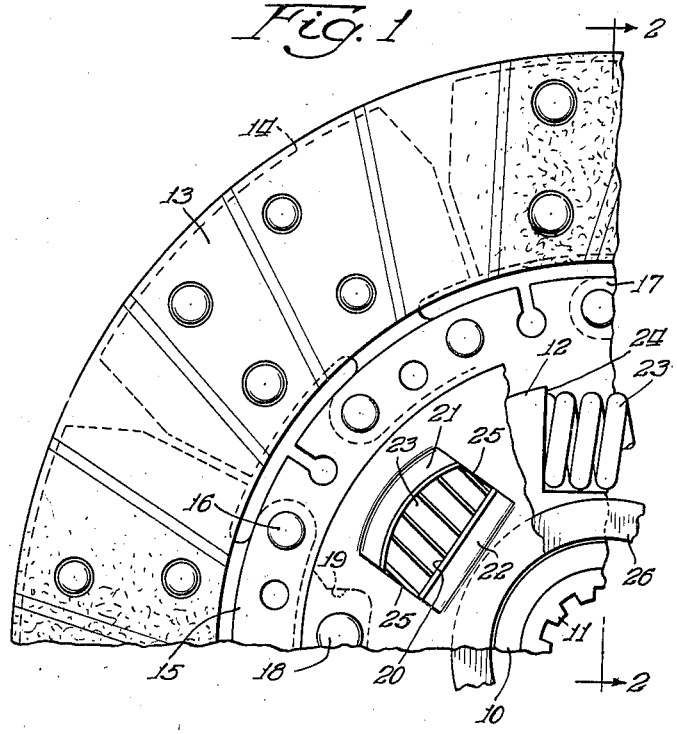
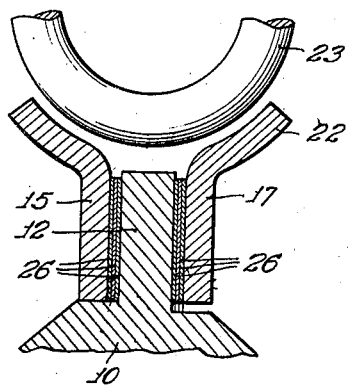
Inventor:
Harold Nutt
By: Edward C. Gritzbaugh
Atty.

Patented Mar. 24, 1942

2,277,558

UNITED STATES PATENT OFFICE 2,277,558

TORSIONAL VIBRATION DAMPENER

Harold Nutt, Chicago, Ill., assignor to Borg-Warner Corporation, Chicago, Ill., a corporation of Illinois Application July 29, 1940, Serial No. 348,085

5 Claims. (Cl. 192—68)

This invention relates to friction clutch driven plates of the type wherein the friction facing portion of the plate is connected to the hub portion thereof by vibration dampening means including a series of springs for cushioning the torque reactions and friction braking means for damping out oscillations between the friction facing and hub portions. The general object of the invention is to improve upon the characteristics of the friction braking portion of such a dampener.

In the past it has been customary to employ washers of non-metallic material in the friction braking portion of a torsional vibration dampener, one of the reasons for such use being that in a vibration dampener employing this type of friction material, the friction range of the dampener, in operation in a vehicle, remains more nearly equal to the initial friction range after assembly. However, it has never been possible to hold a high friction over long periods of use of vibration dampeners incorporating non-metallic washers.

The present invention involves the discovery that by employing a plurality of thin steel washers in place of each of the non-metallic washers previously used, it is easily possible to obtain anywhere from 50% to 100% more friction without increasing any dimension of the assembly and, at the same time to attain a stabilized friction which may be maintained at a substantially constant level throughout the life of the clutch plate. In addition, the invention reduces wear on the washers to a very low point as compared with a single steel washer or non-metallic washer.

Accordingly, the invention has as its object to provide a friction clutch plate embodying a torsional vibration dampener, which, without increasing the dimensions of the assembly, attains a stabilized friction anywhere from 50% to 100% higher than has been possible in the use of non-metallic washers, which maintains a high level throughout the life of the plate, and which does not show material wear. Other objects, the advantages and uses of the invention will become more apparent after reading the following specification and claims, and after consideration of the drawing forming a part of the specification, wherein:

Fig. 1 is an axial sectional view through a clutch plate embodying the invention;

Fig. 2 is a fragmentary side elevation of the same, and

Fig. 3 is an enlarged sectional view of the friction braking mechanism.

As an example of one form in which the invention may be embodied, I have shown in the accompanying drawing a friction clutch plate embodying a hub portion, a friction facing assembly, and cushioning and vibration dampening means interposed between such hub portion and facing assembly.

The hub portion includes a hub proper 10 having internal splines 11 adapted to engage with a splined section of a driven shaft, and an annular flange 12 forming one member of the torsional dampener construction. The friction facing assembly includes friction facings 13 and a pair of complementary spring housing rings 15 and 17, the ring 15 also comprising a mounting member on which the facings 13 are mounted by means of resilient sheet metal cushions 14. The cushions 14 are secured to the ring 15 by means of rivets 16.

The rings 15 and 17 are secured together in axially spaced relationship by means of spacing rivets 18. The rivets 18 are embraced within notches 19 in the flange 12 and coact with the extremities of said notches 19 to limit the oscillatory movement between the rings 15 and 17 on the one hand and the flange 12 on the other hand.

The rings 15 and 17 are formed with windows 20 defined between shrouds 21 and 22, the former being toroidal and the latter being cylindrical in shape. Cushioning springs 23 are encaged between the shrouds 21 and 22 and received in notches 24 opening into the peripheries of flange 12. The ends of the springs 23 are engaged between the extremities of the flange 12 defining the notches 24 on the one hand, and the extremities 25 of the windows 20 on the other hand.

Changes in the torque load on the driven plate are cushioned by the springs 23, and the oscillations which thus tend to be set up are dampened by the friction braking mechanism which will now be described.

Between the inner regions of the rings 15 and 17 on the one hand and the flange 12 on the other hand, are interposed two sets of at least three thin steel washers 26, one set on each side of the flange 12. The washers 26 are assembled under compression between the flange 12 and the rings 17, 15, such compression being imposed by the rivets 18. The washers 26 are arranged in series, with the two outer washers each having one face in engagement with an inner surface of a ring 15 or 17 or the flange 12, and its other face in engagement with an adjacent face of the central washer. As a result of this series arrangement, the amplitude of oscillation between any given pair of friction faces is reduced, as compared to the amplitude of movement between the flange and the rings 15 and 17, to a fraction the denominator of which is one more than the number of washers employed in a given set. For example, where three washers are used, the amplitude of movement between any given set of faces will be only ¼ that between the flange and the rings 15, 17. I find that by using at least three washers in series, it is thus possible to so reduce the amplitude of oscillation between the friction faces as to eliminate the possibility of galling of the surfaces and to substantially eliminate wear.

More important, I find that after a very short period of initial operation, the friction will jump from a low initial level to a level more than twice as high, and will maintain this level with only a moderate loss throughout a long period of operation. To illustrate these characteristics, a plate embodying the invention was tested on a testing machine in which the hub was oscillated its full amplitude through twelve hundred cycles of oscillation per minute, and the friction measured in terms of the distance, along an arc of 7½ inch radius, that the plate failed to return to an initially deflected position at 50 foot pounds torque, when over traveled beyond such position and the load gradually released. Such tests, performed upon a plate embodying two sets of three washers in series, each washer being .015 inch thick and having exterior and interior diameters of 2⅛ in. and 1⁴⁹⁄₆₄ in. respectively, showed an initial friction of .060 inch, which was increased during the first 5 minutes of operation to .138 inch, thence gradually increased during the first 30 minutes of operation to .140 inch, gradually decreased to .102 inch at the end of 15 hours of operation and thereafter remained stable.

At the end of the run, it was impossible to measure any loss of thickness of the washers with a micrometer nor to detect any appreciable wear on the surfaces of the hub flange and the ring 15, 17. At the end of a 1 hour run, the surfaces of the washers were found to be covered with a red layer of oxide on both sides. This oxide layer appears to prevent further wear and has a high coefficient of friction. It is believed that the oxide layer is responsible for the stability of friction which is attained.

The vibration dampener embodying the invention differs very sharply from vibration dampeners which have been previously tried, in which a single steel washer was employed on each side of the hub flange. In such an arrangement, the initial build up in friction may run as high as 300% as a result of abrasion. This is particularly true if cupped washers are used. With the present invention on the other hand, employing three or more flat steel washers, the maximum friction build up does not result from abrasion. The pair of surfaces having the least friction will slip until the friction on that area equals or exceeds the friction between another pair of surfaces. After a short period of operation in which this occurs, all of the surfaces seem to stabilize at about the same friction.

I have made attempts to provide a clutch plate embodying multiple steel washers in which the initial friction is substantially the same as the stabilized friction. However, this necessitates the baking of all of the parts having friction surfaces including the hub and the ring 15, 17, which is undesirable because it is expensive and because the parts will rust rapidly after baking and present an unsightly appearance. Attempts to clean the friction washers thoroughly by alkali degreasing methods have not proven successful.

The present invention eliminates the necessity for special cleaning operations, involving as it does the discovery that the washers may be assembled without cleaning and the initial period of operation will eliminate those characteristics caused by the presence of films of foreign matter on the surfaces, and will stabilize the surfaces at a maximum friction which will endure for a long time. It appears that no matter how clean and dry the surfaces are, the initial friction will always be about one half as great as the stabilized friction.

The shrouds 21 are formed on a sharper radius than the radius of the clutch axis. This gives an advantage in eliminating rubbing of the ends of the springs against the shrouds during compression, which occurs when the shrouds are concentric with the clutch axis. The ends of the springs will contact the shrouds 21 normally, i. e., when they are uncompressed, so as to be properly positioned, but the ends of the springs which move with the hub will clear themselves of contact with the shrouds during compression. The notches 24 are defined between edge regions 30 of the hub flange which are parallel to each other. The springs are short, relatively stiff, and do not readily bend. As a result, the cleared ends of the springs will not move out of position under the effect of centrifugal force for the reason that in order to do so the spring would have to tilt, at their other ends, with reference to the edges 25 of the windows 20 and this it cannot do without undergoing additional compression. The frictional engagement of the cleared ends against the edges of the notches 24 is therefore effective to retain the cleared ends in position against the effect of centrifugal force. The stiffness of the springs is such that centrifugal forces cannot distort the springs sufficiently to permit any slippage of the cleared ends from position. Accordingly, the clearance is maintained at all times during compression of the springs.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. A friction clutch driven plate comprising a hub having a flange, a facing assembly including a ring, said ring and flange having opposed friction faces axially spaced, and a plurality of thin steel washers interposed between said faces in series, said washers having friction faces in frictional engagement with said flange and ring faces and with each other under compression, said friction faces having a friction characteristic stabilized, as a result of a short initial period of operation, at an adequate level which is maintained over a long period of operation.

2. A friction clutch driven plate comprising a hub having a flange, a facing assembly including a supporting ring having an inner region lying adjacent and slightly spaced axially from said flange, said flange and ring having opposed flat friction faces, at least three thin metal friction washers interposed between said flange and ring, and means whereby said washers are confined between said flange and ring under compression, said washers having friction faces in engagement with said friction faces of the flange and ring and with each other in series so that the amplitude of oscillation between any given pair of friction faces will be only a fraction of the total amplitude of oscillation between the flange and ring.

3. A clutch driven plate as defined in the preceding claim, wherein said flange, ring, and washers are all of ferrous metal.

4. A clutch plate as defined in claim 2, wherein said flange, ring, and washers are all of ferrous metal and said friction faces are each provided with a coating of iron oxide and have a friction coefficient which is stabilized for a long period of operation at a level considerably above that of the friction developed in the initial operation of the plate.

5. A clutch plate as defined in claim 2, wherein said flange, ring, and washers are all of steel and wherein said friction faces have a coefficient of friction which is stabilized, after an initial period of operation, at a level at least one and one-half times as high as that at the beginning of operation after assembly.

HAROLD NUTT.